(No Model.)
W. P. & N. F. HYATT.
MACHINE FOR HARDENING SEAMLESS FELT BOOTS AND OTHER HOLLOW FELT ARTICLES.
No. 339,554. Patented Apr. 6, 1886.
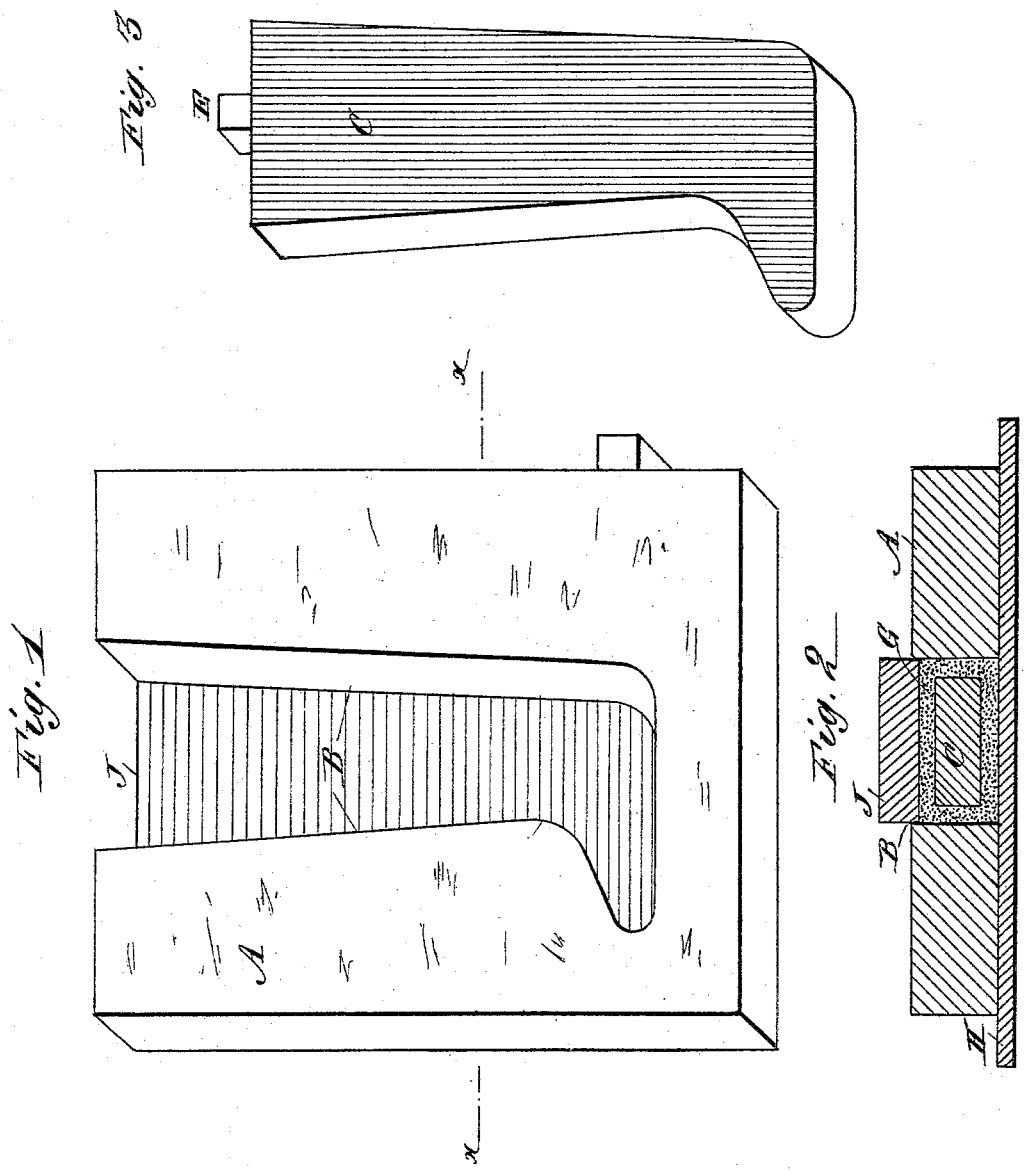
WITNESSES:
C. Neveux
C. Sedgwick
INVENTOR:
W. P. Hyatt
N. F. Hyatt
BY Munn & Co
ATTORNEYS.

United States Patent Office.

WALTER P. HYATT AND NELSON F. HYATT, OF MATTEAWAN, NEW YORK.

MACHINE FOR HARDENING SEAMLESS FELT BOOTS AND OTHER HOLLOW FELT ARTICLES.

SPECIFICATION forming part of Letters Patent No. 339,554, dated April 6, 1886.

Application filed November 25, 1885. Serial No. 183,941. (No model.)

*To all whom it may concern:*

Be it known that we, WALTER P. HYATT and NELSON F. HYATT, of Matteawan, Dutchess county, New York, have invented a new and Improved Machine for Hardening Seamless Felt Boots and other Hollow Felt Articles, of which the following is a full, clear, and exact description.

The object of our invention is to provide a new and improved machine for hardening seamless felt boots, shoes, and other hollow felt articles in such a manner that no subsequent stitching, finishing, felting, or hardening is required for firmly uniting the edges of the bats to complete the article.

The invention consists in a solid mold having a recess of about the shape of the desired article, combined with a core which can be placed in the recess and vibrated in the same.

Reference is to be had to the accompanying drawings, forming part of this specification, in which similar letters of reference indicate corresponding parts in all the figures.

Figure 1 is a perspective plan view of our improved machine for hardening hollow felt articles. Fig. 2 is a cross-sectional view of the same. Fig. 3 is a perspective plan view of the core.

The mold consists of a block, A, of wood or metal, provided in its top with a recess or cavity, B, which has a shape approaching that of the article to be made—in the case shown a boot. The recess or cavity extends entirely or partly through the block.

The block or mold may be made hollow or solid and provided with apertures to admit steam.

The core C has almost the shape of the article to be made, except that in many cases, for convenience in hardening, the angles of the core are nearly at right angles, while the resultant article may have a rounded or cylindrical surface, and the core is a trifle smaller and has a trifle less thickness than the mold.

The core may be made solid or hollow, and may also be perforated.

The mold and core are covered on their working-surfaces with burlap.

The thickness, shape, and size of the mold vary with the size, nature, &c., of the article to be made.

The core C is provided with a lug, E, for attaching a jigger, vibrator, &c.

In making the felt article the mold is placed upon a suitable table, H, a bat, G, of wool, of any desired thickness, either broken down—that is, partially hardened with unhardened edges—or wholly unhardened, is placed over and worked down into the mold, the core C is placed on the bat in the recess in the mold, and then the edges of the bat are lapped over on the top of the core, and, if desired, another bat is placed on the lapped parts of the bat G and upon the core C. In either case the hardening-board J is placed upon the top of the mold and core, and the core is vibrated, or, in case the partially broken-down bat is used, the core and hardening-board are vibrated. After the hardening has been completed, which requires more or less time, according to the thickness of the bat, the article is removed from the mold, the core is removed from the article, and the article finished in the usual manner.

The edges of the bats are securely united by the hardening process, and no knitting, winding, stitching, or basting is required to unite the bats.

The hardening-board may be flat and smooth on the under side, or may have a projection of the shape of the core on its under side.

Having thus described our invention, we claim as new and desire to secure by Letters Patent—

1. In a machine for hardening felt boots, shoes, and other hollow felt articles, the combination, with a mold provided with a cavity or recess of the shape of the article to be produced, of a core smaller than the cavity, substantially as herein shown and described.

2. In a machine for hardening felt boots, shoes, and other hollow felt articles, the combination, with a mold having a recess or cavity of the shape of the article to be produced, of a core smaller than the cavity and of the hardening-board, substantially as herein shown and described.

WALTER P. HYATT.
NELSON F. HYATT.

Witnesses:
HENRY W. WOLCOTT,
CHARLES M. WOLCOTT.